Nov. 26, 1940.    J. S. PARENTI    2,222,823
PUMPING APPARATUS
Filed March 10, 1938    5 Sheets-Sheet 1

INVENTOR
Joseph S. Parenti
BY
Parker, Brockman & Farmer
ATTORNEYS

Nov. 26, 1940.   J. S. PARENTI   2,222,823
PUMPING APPARATUS
Filed March 10, 1938   5 Sheets-Sheet 2

INVENTOR
Joseph S. Parenti
BY
Parker, Prochnow & Farmer
ATTORNEYS

Nov. 26, 1940.    J. S. PARENTI    2,222,823
PUMPING APPARATUS
Filed March 10, 1938    5 Sheets-Sheet 3

INVENTOR
Joseph S. Parenti
BY
Parker, Prochnow & Farmer
ATTORNEYS

Patented Nov. 26, 1940

2,222,823

UNITED STATES PATENT OFFICE 2,222,823

PUMPING APPARATUS

Joseph S. Parenti, Buffalo, N. Y., assignor, by direct and mesne assignments, to The Fluidpoise Manufacturing Company, Inc., Buffalo, N. Y.

Application March 10, 1938, Serial No. 195,067

18 Claims. (Cl. 103—46)

This invention relates to improvements in pumping apparatus.

My improved pumping apparatus is particularly well adapted for use in connection with the pumping of deep wells, such as oil wells, but it is not intended to limit the invention to such use, for the reason that it can readily be employed for any other pumping operation.

One of the objects of this invention is to provide an improved pumping apparatus which is so constructed as to avoid the difficulties heretofore commonly encountered in connection with the valves of pumps of this kind, thereby producing a pump capable of operating for long periods of time without requiring repairs or adjustments. Another object is to provide a discharge valve which is so constructed that the pressure of the pumped fluid acts on a valve in a direction to unseat the same and in opposition to the force tending to seat the valve, whereby a gentle seating of the valve takes place; also to provide a valve of this kind with adjustable means for seating the valve, so that the resulting force tending to seat the valve may be regulated as desired, regardless of the pressure against which the pump is working. Another object is to provide a valve which is held against striking its seat by a cushion of the fluid which is being pumped. A further object is to provide a discharge valve which is held in its closed position by means of resilient pressure acting independently of the pressure resulting from the head of the medium which is being pumped.

Another object of this invention is to provide a pumping apparatus of improved construction, which is capable of pumping against high heads. Still another object is to provide a pump of this kind which is particularly adapted to be driven by a solenoid; also to provide a pump of this kind in which the pump piston during its working stroke encounters substantially the same resistance regardless of the head against which the pump operates. It is also an object of this invention to provide a pump of this kind in which the seating of the discharge valve is controlled by the movement of the piston. A further object is to provide a discharge valve which exerts pressure against the pump piston to start the same on its return stroke. Another object is to provide a pump of this kind with means of improved construction for providing a pneumatic chamber or dome against which the pump pressure acts.

A further object of this invention is to provide a pump of this kind of improved construction having a small displacement but large capacity due to rapid operation of the pump; also to provide a pump of this kind which is so arranged for cooperation with a solenoid that the pump piston will move against a relatively small resistance during that portion of the movement of the solenoid plunger in which the plunger exerts a smaller force. It is also an object of this invention to provide a solenoid operated pump in which a certain amount of inertia is imparted to the pump piston and the movable parts connected therewith before the piston encounters heavy resistance. A further object is to provide a pump in which the solenoid imparts motion to the piston in one direction only; also to provide a pump of this kind with means of improved construction for absorbing the inertia of the movable parts toward the end of the return stroke of the same; also to provide means of improved construction for circulating a cooling medium to prevent excessive rise in temperature of the solenoid coil; also to provide a pump of this kind with means for simultaneously yieldingly stopping the return movement of the movable parts of the pumping mechanism and circulating cooling fluid.

Still another object of this invention is to provide a solenoid operated pump in which the solenoid plunger has a conical end cooperating with a conical recess in the plunger stop in such a manner that the greater part of the stroke of the piston takes place while the conical end of the plunger is within the conical recess of the stop.

Other objects of this invention will appear from the following description and claims.

In all of the various embodiments of my invention illustrated in the accompanying drawings, the pump is shown as actuated by means of a solenoid. It will be understood, however, that it is not intended to limit the pump constructions embodying this invention to use in connection with solenoids, since it will be obvious that other means for supplying power to the pump may be employed.

Figures 1, 2:
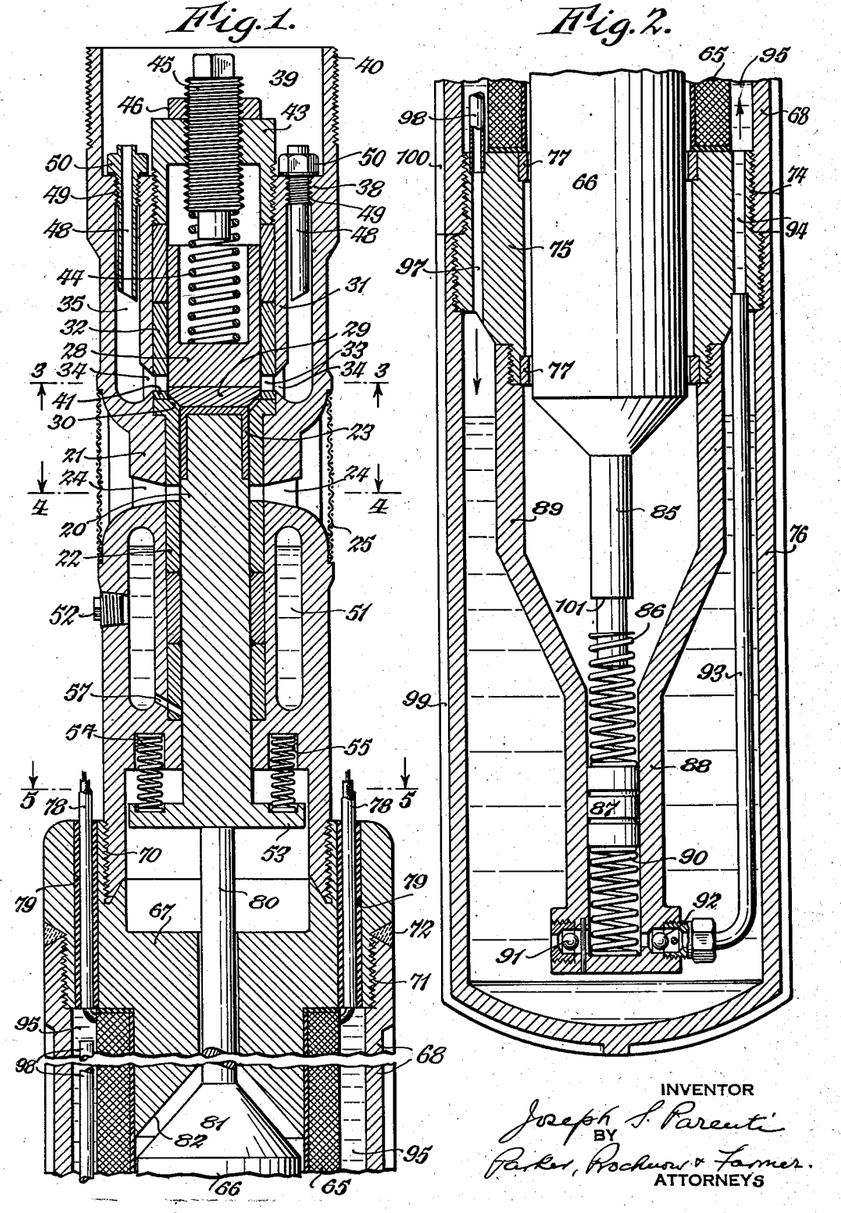
Fig. 1 is a fragmentary central sectional view of a portion of a pumping apparatus embodying this invention.
Fig. 2 is a similar view of the remaining portion of the pumping apparatus shown in Fig. 1.
Figure 3:
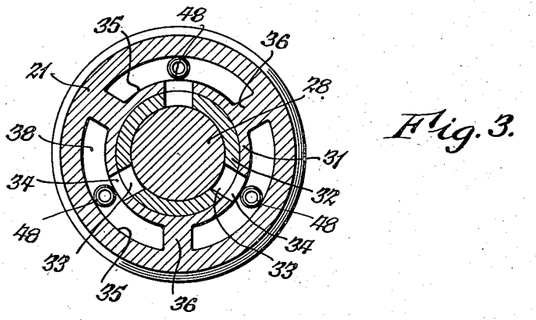
Figs. 3, 4 and 5 are transverse sectional views on lines 3—3, 4—4, and 5—5 respectively of Fig. 1.
Figure 4:
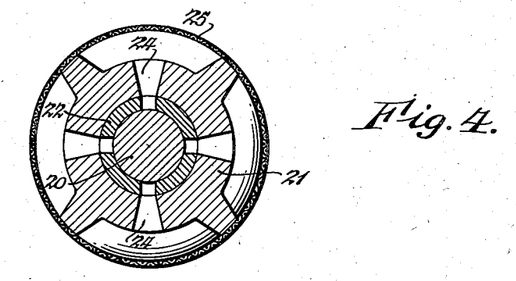
Figure 5:
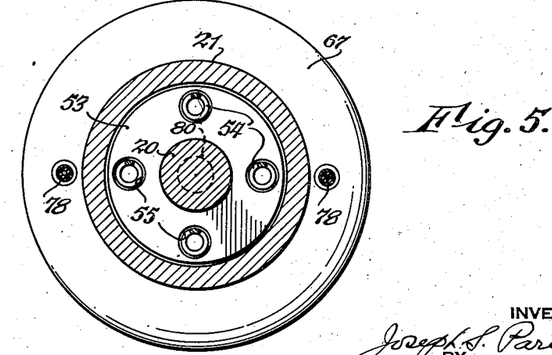

In the particular embodiment of this invention shown in Figs. 1 to 5, 20 represents the reciprocatory piston of the pump, and 21 represents a housing or casting in which the cylinder for the piston 20 is formed. In the event that the pump derives its power from a solenoid, the housing or casting 21 and the body portion of the piston 20 are preferably made of non-magnetic material, such for example as a suitable bronze. If the pump is to be used in connection with the pumping of oil wells in which gritty or abrasive substances may be carried with the oil, it is desirable to provide a lining for the cylinder made of a hard material or alloy, and similarly a portion of the piston may be made of a similar material. For this reason, there is illustrated in Figs. 1 and 4, a cylinder lining 22 which may be of any suitable steel or alloy capable of resisting abrasion. In the particular construction shown, the lining 22 may be made in a number of annular sections or parts. The head portion of the piston, in the construction shown, is also provided with an outer shell or cap 23 of hard material. The housing or casting 21 and the corresponding portion of the lining 22 are provided with radially extending alined openings 24 which form the inlet ports of the pump, see also Figure 4, if desired, a screen 25 may be arranged about this portion of the housing to exclude large solid particles from entering into the inlet ports 24.

One of the difficulties with deep well pumps heretofore has been that the discharge valves are subjected to such extreme pressures that these pressures together with the pounding of the valves against their seats result in rapid deformation of the valves, so that they no longer close the discharge ports. For this purpose, I have provided an improved discharge valve, which in the particular construction shown, also serves as a head for the cylinder in which the piston 20 operates and is preferably of larger diameter than the diameter of the piston. In Fig. 1, I have provided a valve 28, which may have a lower portion 29 of hardened material suitably welded or otherwise secured thereto and having a frusto-conical outer surface which cooperates with a corresponding seat 30 formed on the upper end of the cylinder or lining sleeve 22. This valve is mounted to reciprocate into open and closed positions in a suitable cylindrical guide 31, which, if desired, may also be provided with a lining sleeve 32 of hardened material. The lining sleeve for the valve 28 may also be made in several annular sections and the lowest section is provided with suitable discharge ports or openings 33 which register with openings 34 in the lower portion of the valve guide cylinder 31. These openings 33 and 34 terminate at their outer ends in an annular space 35 arranged between the outer wall of the casting or housing member 21 and the valve guide cylinder 31 which is preferably formed integral with the casting or housing 21. As clearly shown in Fig. 3, several longitudinally extending ribs 36 connect the housing 21 with the cylindrical valve guide member 31, forming between them several spaces 35 for the fluid discharged from the pump. At the upper end of the discharge spaces 35 in the casting or housing, a transverse web or partition 38 may be provided, which is also formed integral with the cylindrical valve guide member 31 and the housing 21, and passages are formed through this transverse wall or web 38 into a chamber 39 formed in the upper end of the pump housing 21. This upper end may be provided with suitable screw threads 40, whereby the pump housing may be rigidly connected to suitable discharge pipes, which may, for example, extend to the upper end of the well, if the pumping apparatus is used for well pumping.

It will be noted that in addition to the conical seat 30 formed on the upper end of the lining 22 of the pump cylinder, the discharge ports 33 are formed slightly above the lower end of the lining member 32 of the valve guide cylinder 31, so that the valve 28, when in closing position not only forms a seal at the conical seat 30, but also the cylindrical portion of the valve closes the ports 33. The valve thus forms a double seal against the return of pumped fluid into the pump cylinder and the lower cylindrical portion 41 of the lining member 32 below the ports 33 cooperates with the cylindrical portion of the valve immediately above the conical portion of the valve in such a manner as to entrap a small body of the fluid which is being pumped, to form a cushion, which prevents pounding of the valve on its seat, as will be hereinafter more fully explained.

In many cases, it is desirable to avoid having the valve 28 forced toward its seat by the pressure of the medium which has been pumped and this can readily be accomplished by providing at the upper end of the valve guiding cylinder 31 suitable means for yieldingly urging the valve to its seat. In the construction shown for this purpose, I provide a plug or closure 43, which closes the upper end of the valve guide cylinder and excludes the fluid which is pumped from the interior of this cylinder, the lower end of which abuts against the uppermost part of the lining sections 32, and as may be clearly seen in Fig. 1, this plug 43 serves the further purpose of pressing all of the lining members 32 and 22 against each other and against the bottom of the space provided for these lining members in the casting or housing 21. The lower end of the plug 43 is preferably made hollow and the upper end of the valve 28 may also be provided with a recess so that a valve seating spring 44 may be arranged within the recess of the valve 28 and in the upper end of the hollow plug 43. In order to make it possible to vary the amount of pressure which the spring 44 exerts against the valve for seating the same, an adjusting screw 45 is preferably provided which extends through a threaded hole in the plug 43 and engages the upper end of the spring. A lock nut 46 may be provided to hold the adjusting screw 45 in the desired position. By means of this construction, the pressure with which the spring acts on the valve may readily be varied. It will, of course, be seen that the pressure with which the valve 28 is forced to its seat must at all times be greater than the maximum head against which the pump must work, since when the valve is in open position, the pressure of the fluid which has been pumped presses upwardly against the lower face of the valve, and this pressure must be overcome by the pressure of the spring 44, or other compressible medium.

From the foregoing description, it will be obvious that during the down stroke of the piston from the position shown in Fig. 1, a partial vacuum will be formed in the cylinder above the piston until the piston head passes below the intake ports 24, at which time the fluid to be pumped will rush through the intake ports into the cylinder above the head of the piston. During the upward stroke of the piston, after the same closes the intake ports 24, the pressure applied to the fluid in the cylinder will force the valve 28 upwardly from its seat so that the fluid will be discharged through the discharge ports or openings 33 and 34. The travel of the piston is preferably so arranged that during the upper limit of the movement of the piston, the upper end of the same will be above the seat 30 of the valve, preferably approximately in a horizontal plane passing through the middle portions of the discharge ports 33 and 34. As soon as the fluid between the lower face of the valve 28 and the head of the piston has passed laterally out through the discharge ports, the valve 28 will contact with the head of the piston and then exert pressure against the piston to cause the same to start movement in the direction of the return stroke. This pressure by the valve 28 is continued and the return movement of the piston is accelerated until the lowest cylindrical portion of the valve 28 closes the discharge ports 33 in the lining member 32. It will be seen from Fig. 1 that the closing of these ports takes place before the conical lower end of the valve engages the conical seat 30. Consequently, a small body of fluid is entrapped between the conical valve seat 30 and the corresponding conical portion of the valve 28 and this small body of fluid acts as a cushion to prevent pounding of the valve against its seat. This cushion only acts momentarily since upon continued downward movement of the piston 20, the entrapped fluid will be discharged into the space above the piston head, and this escape of fluid from the space between the conical valve seat 30 and the corresponding face of the valve takes place slowly enough so that the valve moves into contact with its seat gently and without shock or blow, regardless of the pressure head of the fluid. In Fig. 1 the piston and valve are shown in the position in which this fluid cushion is formed and upon continued downward movement of the piston, a partial vacuum is formed, in the space between the valve 28 and the head of the piston and this space is again filled with fluid when the intake ports 22 are uncovered by the piston.

It will be noted from the foregoing description that the pressure resulting from the head of the fluid which is being pumped is exerted against the valve 28 only in a lateral direction, and consequency, does not urge the valve to its seat. The seating of the valve is accomplished solely by the spring 44. Furthermore, the seating of the valve takes place very gradually, the movement of the valve toward its seat being retarded by the fact that the greater portion of the force of the spring 44 is exerted in imparting motion to the piston 20. By the time the valve moves into close proximity to its seat, the movement of the piston has been accelerated to a considerable speed, but before the valve moves into its final seating position, its speed is checked by the fluid cushion which has been described. Consequently, the valve 28 moves into its seating position slowly and all hammering and pounding of the valve and, consequently, damage to the valve and to its seat are entirely avoided.

The pump construction described has the further advantage that large discharge ports 33 and 34 are provided which avoid the wire drawing of the liquid through small openings, which is objectionable in the case of pumping of certain liquids, such as mixtures of oil and water, for the reason that the wire drawing results in the making of emulsions which in turn result in increased difficulty in the separation of oil from water. It will also be noted that, since the area of the lower face of the valve is greater than that of the upper face of the piston, proportionally less upward pressure is required to move the piston through its working or pumping stroke than is required to raise the valve into its upper position within the valve guide cylinder 31. The construction described also facilitates the lubrication of the valve, since the space within the cylinder 31 above the valve 28 may be partly filled with a lubricating oil.

In some cases, it may be desirable to provide a pneumatic chamber or dome against which the pumped liquid may react for the purpose of providing for a substantially continuous discharge of liquid from the pumping apparatus instead of an intermittent discharge at each stroke of the piston. This can be readily provided in the construction shown by arranging in the transverse partition 38 one or more pipes or tubes 48 which extend downwardly below the partition into the discharge spaces 35. These tubes or pipes may be secured in the transverse partition 38 in any suitable or desired manner, for example, by providing each tube with a threaded portion 49 of larger diameter than the portion of the tube extending into the discharge space 35, and with an enlarged flange or head 50, so that these tubes can be secured in threaded holes in the partition 38 and extend a substantial distance below the upper ends of the discharge spaces 35. By means of this arrangement, air or gas will be entrapped in the spaces 35 above the lower open ends of the tubes 48 while liquid will be discharged upwardly through the tubes. In the construction shown, three of these tubes are provided, but for the sake of clarity, both tubes are shown in the section illustrated in Fig. 1, one of the tubes being shown in section. During the pumping stroke of the piston 20 liquid discharged into the discharge spaces 35 will produce an increased pressure of the air or gas in the upper portions of these discharge spaces, which increased pressure will in turn force liquid upwardly through the tubes 48 during the return or suction stroke of the piston. Any other means for providing a pneumatic chamber or dome may be employed, if desired.

If desired, the piston may be lubricated by means of oil or lubricant stored in the pump housing or casting 21. This may, for example, be accomplished by providing in the lower portion of the housing a chamber 51, for example, by coring an annular cavity in the housing 21 about the cylinder. This cavity may be rendered accessible for removing the core and for admitting lubricant by means of an opening in the wall of the housing 21 leading into the cavity 51, which opening may be threaded and closed by means of a screw plug 52. One or more oil passages 57 may be provided which lead from the cavity 51 and through one of the lining sections 22 to the piston 20.

The piston of my improved pump may, of course, be reciprocated by means of any suitable or desired means. I prefer to employ a solenoid for imparting motion to the piston when the pumping apparatus is used in connection with deep wells in which a casing of limited diameter is used. Preferably, the solenoid applies force to the piston in one direction only and the piston may be moved in the opposite direction by means of energy stored during the power stroke of the plunger of the solenoid. Any suitable means for storing power may be employed such, for example, as springs. In the construction shown in Fig. 1, the lower end of the piston is provided with an outwardly extending enlargement or flange 53 and a plurality of springs 54 act on the upper face of the flange 53 and extend into holes or recesses 55 provided in the pump housing or casting 21. In the construction shown in Fig. 1, power is applied to the piston during the upward or pumping stroke, which compresses the springs 54, as well as the spring 44 of the valve 28. Consequently, when the upwardly directed force on the piston is interrupted, the springs 44 and 54 press the piston downwardly during the initial portion of its stroke. After the valve 28 has become seated, the springs 54 continue to press the piston downwardly until the same uncovers the intake ports 24 to admit another charge of the fluid to be pumped into the cylinder.

In the particular construction illustrated, I have provided a solenoid including a coil 65 which may be wound in any usual or suitable manner and which cooperates with a movable core or plunger 66 slidably arranged in the coil. A plunger stop 67 of suitable magnetic material extends downwardly into the upper end of the solenoid coil 65 and a housing 68 also of magnetic material surrounds and encloses the coil. The parts of the solenoid may be suitably connected with the pump housing 21 in any suitable or desired manner. For example, in the construction shown in Fig. 1, the plunger stop 67 may be provided at its upper end with a cupped or recessed portion having an internal thread 70 into which the threaded lower end of the pump housing 21 extends. The connected parts of the housing and stop may be formed in any suitable manner to provide a tight connection or seal to exclude liquid from the interior of the solenoid housing. The recessed upper end of the stop 67 also receives the lower end of the piston 20 and its flange 53 when the piston is in its lowest position. Since the piston is preferably made of non-magnetic material, it is not affected by the magnetism in the solenoid stop 67. I have also provided on the plunger stop an externally threaded part 71 which engages with a correspondingly internally threaded part on the upper end of the solenoid housing 68 and a welded joint 72 may also be employed between the plunger stop and the upper end of the solenoid housing to assure a liquid tight joint between the housing and the stop and a magnetic path of low reluctance between the housing and stop. At the lower end of the solenoid housing 68 another internally threaded portion 74 is provided which engages with a correspondingly threaded portion of a sleeve 75 of magnetic material arranged at the lower end of the coil 65, see Fig. 2. The lower end of the solenoid housing is preferably closed by means of a cylindrical shell 76 having its lower end closed and having its upper end internally threaded to engage a correspondingly threaded portion of the magnetic sleeve 75, the shell 76 being preferably made of a non-magnetic material so as to confine the magnetism of the solenoid to the vicinity of the coil 65 thereof. The sleeve 75 may be provided on its inner surface with bearing rings 77 of non-magnetic material which cooperate with the plunger 66 to guide the same in its axial movement with reference to the coil 65. Current may be conducted to the coil in any suitable manner, and in the construction illustrated, a pair of insulated conductors 78 extend through suitable apertures or passages 79 in the solenoid stop 67. In the case of well pumps, the conductors 78 may pass upwardly to the surface where suitable means for controlling the passage of current to the solenoid coil may be provided.

The plunger 66 of the solenoid is preferably connected by means of a rod 80 with the piston 20, and in the construction illustrated, this rod extends loosely through a central aperture of the solenoid stop 67 into engagement with the lower end of the piston 20 and may be secured to or loosely engage the piston, as may be desired. I have also provided the plunger 66 with a cone-shaped end 81 which is adapted to enter into a correspondingly shaped conical aperture 82 in the lower part of the plunger stop.

It will be noted from the foregoing description that when electric power is transmitted by the conductors 78 to the solenoid coil 65, the plunger 66 will be drawn upwardly into the coil 65 and will impart upward motion to the piston 20, the parts in the particular construction shown being so proportioned that when the plunger 66 reaches the upper end of its stroke, the upper end of the piston 20 will be approximately in a plane passing through the middle portions of the discharge ports 33, and when the solenoid coil 65 is de-energized by interruption of the electric circuit, the springs acting on the piston will move the same down below the intake ports 24. The parts of the solenoid are also so proportioned that the greater part of the stroke of the piston will take place while the cone-shaped end 81 is within the conical recess 82 of the plunger stop, since the maximum power of the solenoid is developed during this part of the stroke of the plunger.

As has been stated, the parts of my improved pumping apparatus are also so proportioned that during the intake stroke, the piston head moves at least to the lower edges of the ports 24, so that these ports are opened to their maximum extent to allow liquid to enter into the cylinder, and it may also be desirable to have the piston actually pass somewhat below the intake ports 24.

The plunger shown in Figs. 1 and 2 may move downwardly to a considerably greater extent than the piston by causing the piston to move somewhat below the point at which the intake valves are initially opened and by causing the plunger to move downwardly through a still greater distance, it follows that when the solenoid is energized, the plunger will move upwardly with very little resistance until the plunger rod 80 engages the piston, and then the piston and plunger also will continue to move upwardly with very little resistance until the piston reaches a position in which the intake ports 24 are closed. Consequently, during this portion of the upward movement of the piston and plunger, considerable inertia will be stored in these parts so that the liquid in the cylinder receives a blow as soon as the intake ports are closed, which results in applying a high initial pressure to the liquid sufficient to raise the valve 28 from its seat. This high initial pressure is imparted to the liquid in the cylinder during a portion of the upward movement of the plunger during which the air gap between the plunger and the stop is relatively large and during which the plunger receives less magnetic pull than during later portions of the pumping stroke.

If the pumping apparatus is to be used in a well, it must, of course, be of a diameter sufficiently smaller than the internal diameter of the well casing so that the pumping apparatus may be readily lowered to the bottom of the well casing and removed from the same. For this reason, it may be desirable in order to obtain sufficient power from the solenoid to make the solenoid of considerably greater length in proportion to its diameter than is customary. It may, consequently, be desirable to make the solenoid coil 65 from 10 to 15 times longer than the movement of the plunger 66, and by means of these proportions the necessary pull of the plunger can be obtained. The solenoid shown is very efficient in that the casing or housing 68 of the solenoid has a materially greater cross sectional area than that of the plunger 66 and by making the stop 67 and the sleeve 75 of ample dimensions beyond the ends of the coil, a path of ample cross sectional area and low reluctance is provided. By making the pump housing 21 and the shells 76 of non-magnetic material, the magnetic lines of force are closely confined to a path around the coil 65 and the loss of power and interference with the operation of the pump due to stray magnetism is materially reduced.

Since the stroke of the piston and the consequent movement of the plunger 66 are comparatively short, the plunger remains at all times in a portion of the magnetic field of the solenoid in which ample force is exerted by the plunger to actuate the pump.

I have also provided means for cooling the solenoid coil during the operation of the pumping apparatus. This may be accomplished in any suitable manner, and in the construction illustrated, I have provided the plunger 66 with a downwardly extending rod 85 which may be connected in any suitable manner, preferably through the medium of a spring such as the coil spring 86, with a pump piston 87 arranged in a cylinder 88. This cylinder has an upwardly extending portion 89 which may be secured to the lower end of the sleeve 75 of the solenoid. The cylinder and its extension 89 are preferably made of bronze or other non-magnetic material and the lower end of the cylinder 88 preferably contains another spring 90. An intake valve 91 and a discharge valve 92 are provided in the lower end of the cylinder, the discharge valve controlling a port which connects with a discharge pipe or tube 93 which extends upwardly and terminates in a hole or passage 94 extending through the sleeve 75 of the solenoid. It will be noted that a space is preferably provided between the coil 65 and the solenoid housing 68 and the upper end of the hole 94 terminates in this space. This space may contain any suitable cooling fluid pumped by the piston 87 into the lower end of the space 95 between the solenoid coil 65 and the housing 68. The sleeve 75 is provided with another aperture or passage 97, to the upper end of which is connected an overflow pipe 98 which extends into proximity to the upper end of the space 95 between the solenoid coil and its housing and the overflow pipe drains excess cooling liquid from the space 95 into the shell 76.

The pumping means for the cooling liquid serves the dual purpose of checking the downward movement of the movable parts of the pumping mechanism caused by the springs 86 and 90, and furthermore, this downward movement is checked by the work done by the pumping piston 87, which also serves to circulate cooling liquid. This liquid is contained partly in the shell 76 and partly in the space 95 between the solenoid coil and its housing 68 and, in order to facilitate the cooling of the oil, both the shell and the housing are provided on their outer surfaces with ribs or fins 99 and 100. Consequently, some of the heat generated in the coil 65 is transferred by the cooling liquid directly to the solenoid housing 68 from which it is transferred to the medium surrounding the housing 68, such as the liquid to be pumped in which the pumping apparatus may be immersed. Additional heat is transferred from the liquid through the shell 76 after the cooling liquid passes through the overflow pipe 98 into this shell. The relatively cool liquid near the bottom of the shell 76 is pumped into the lower portion of the space 95 and the hot liquid from the upper portion of this space is discharged through the overflow pipe 98 back into the shell 76. Any suitable cooling liquid may be employed such as a transformer oil or any other liquid having high dielectric and good heat transferring properties. The particular type of coil 65 shown, which is of much greater length than its diameter and, consequently, of relatively small thickness, lends itself particularly well to cooling in this manner, since the heat developed in any portion of the coil has but a short distance to travel to the exterior of the coil, from where it is transferred to the cooling liquid.

The operation of this part of the pumping mechanism will be readily understood, since it is obvious that as the plunger 66 descends during its return stroke, a shouldered portion 101 of the downwardly extending rod 85 will engage the upper end of the upper spring 86 and through this spring transmit a downwardly directed force to the piston 87 so that the same moves downwardly against the action of the spring 90, thus pumping cooling liquid through the valve 92 and pipe 93 into the lower portion of the space 95. The downward movement of the plunger 66 and the piston 20 is thus checked by means of the springs 86 and 90 and because of the work done by the piston 87. The downward movement of the plunger and piston 20 is, consequently, cushioned and checked, and thereupon the spring 90 again moves the piston 87 upwardly to draw in a charge of cooling liquid through the valve 91.

In the modified construction shown in Figs. 6 to 12 inclusive, a pumping mechanism is illustrated which operates upon the same principle as the mechanism shown in Figs. 1 to 5, but which is differently constructed. In this pumping mechanism, 109 represents an outer shell or housing of magnetic material which forms a part of the solenoid and also extends upwardly about a part of the pump. 110 represents the pump piston which is movable in a cylindrical aperture formed in a cylinder block 111, the block being provided with a plurality of inlet ports 112, see Figs. 6 and 9, and also with a downwardly extending portion 113 of reduced diameter to the lower end of which an annular member 114, preferably of non-magnetic material, is secured. The space about the tubular extension 113 is divided by means of an annular wall 116 into an outer annular space and a reservoir 117 for lubricant. The annular member 114 is also provided with a series of recesses 118 into which piston return springs 119 enter, the lower ends of which act upon an outwardly extending flange or enlarged part 120 of the piston. Bolts or rods 121 connect the annular member 114 with a stop 122 of the solenoid and these bolts, in addition to confining the springs 119, also form a rigid connection and spacing means between the fixed parts of the solenoid and the cylinder block. In order to secure the cylinder block 111 in the tubular housing member 109, this member is preferably provided with an internal shoulder 115 on which the outer edge of an insulating and packing disk 123 seats. This disk is pressed against its seat by means of the lower end of a flange 124 of a discharge pipe or duct 125 for the pumped fluid. The outer edge of this flange may, for example, have a threaded engagement with the upper end of the housing 109. The discharge duct also has an internal shoulder 126 engaging a corresponding shoulder of the cylinder block 111, thus pressing the upper enlarged portion of this cylinder block against the insulating disk 123 and in turn securely seating the disk against the shoulder 115 of the tubular housing 116. This construction not only rigidly secures the cylinder block in place in the housing, but also serves to form a tight seal to prevent the fluid which is being pumped from entering into the oil reservoir 117 and other enclosed parts of the pumping mechanism. This construction has the advantage that the cylinder block may be made of iron or steel, since the magnetism in the housing 109 will not readily be transmitted through the insulating disk 123, nor the bronze or non-magnetic discharge duct or tube 125. If the cylinder block is made of iron or steel, the annular member 114 is preferably made of non-magnetic material.

Figure 6:
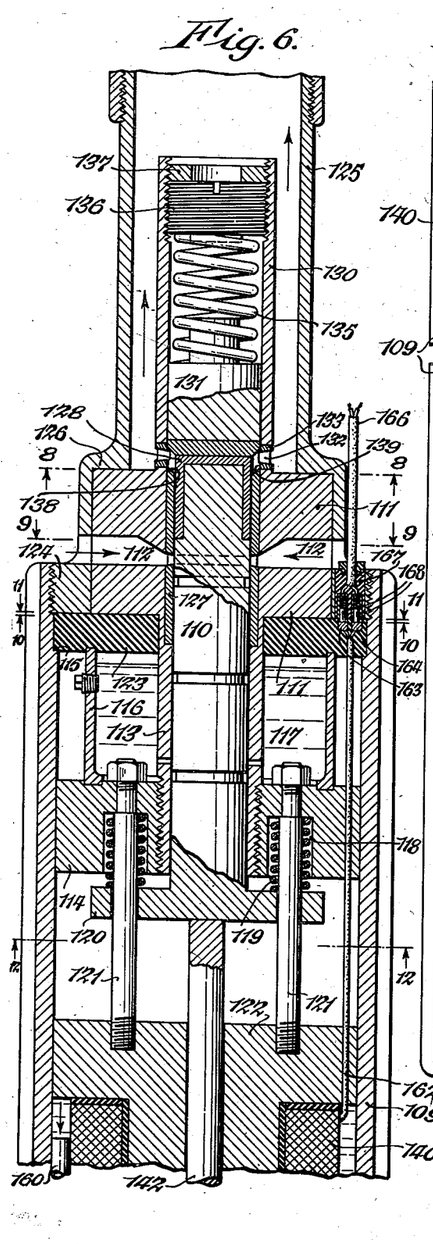
Fig. 6 is a central sectional view of a portion of a pumping apparatus of modified construction.

The cylindrical bore in which the piston 110 operates may be provided with a lining 127 of hard material, such as described in connection with Figs. 1 to 5. Also the piston may be provided with a cap 128 of a hardened material.

In the construction, the cylinder block 111 is provided with an integral upwardly extending cylindrical portion 130 of reduced diameter which forms a guide housing for the valve 131. The valve guide cylinder 130 is preferably provided with suitable discharge ports 132 which may be lined with sleeves or bushings of hardened metal 133.

The valve 131 is also spring pressed to its seat against the pressure of the medium which has been pumped. A spring 135 is, consequently, arranged in the valve cylinder 130 and bears against the upper face of the discharge valve 131, and a screw-threaded plug 136 is adjustably arranged in an internally threaded portion of the upper end of the valve cylinder 130 to vary the compression of the spring 135. 137 represents an annular lock nut arranged in the upper part of the valve cylinder 130. Any other means for yieldingly urging the discharge valve 131 toward the end of the cylinder may, of course, be provided, if desired. This valve, as well as the valve shown in Figs. 1 to 5 has a frusto-conical face adapted to seat on a correspondingly shaped tapered seat 138 on the upper end of the lining member 127 and an annular cylindrical seat 139 is also formed in the lower end of the valve guide cylinder 130 with which a corresponding cylindrical portion of the lower end of the valve 131 cooperates, to provide a cushioning effect on the valve before the same engages its seat, as described in connection with Figs. 1 to 5.

Figure 7:
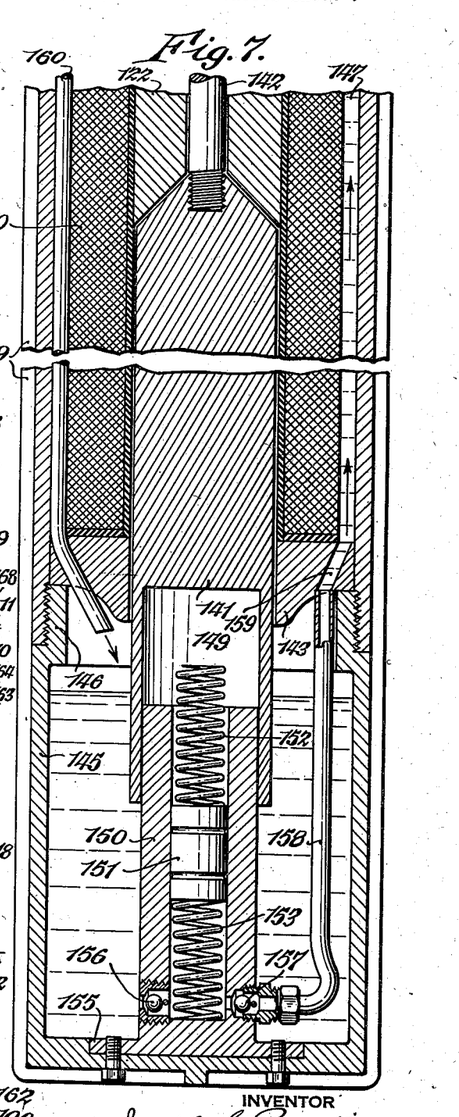
Fig. 7 is a fragmentary central sectional view of the remaining portion of the pumping apparatus shown in Fig. 6.
Figures 8, 9, 10, 11, 12:
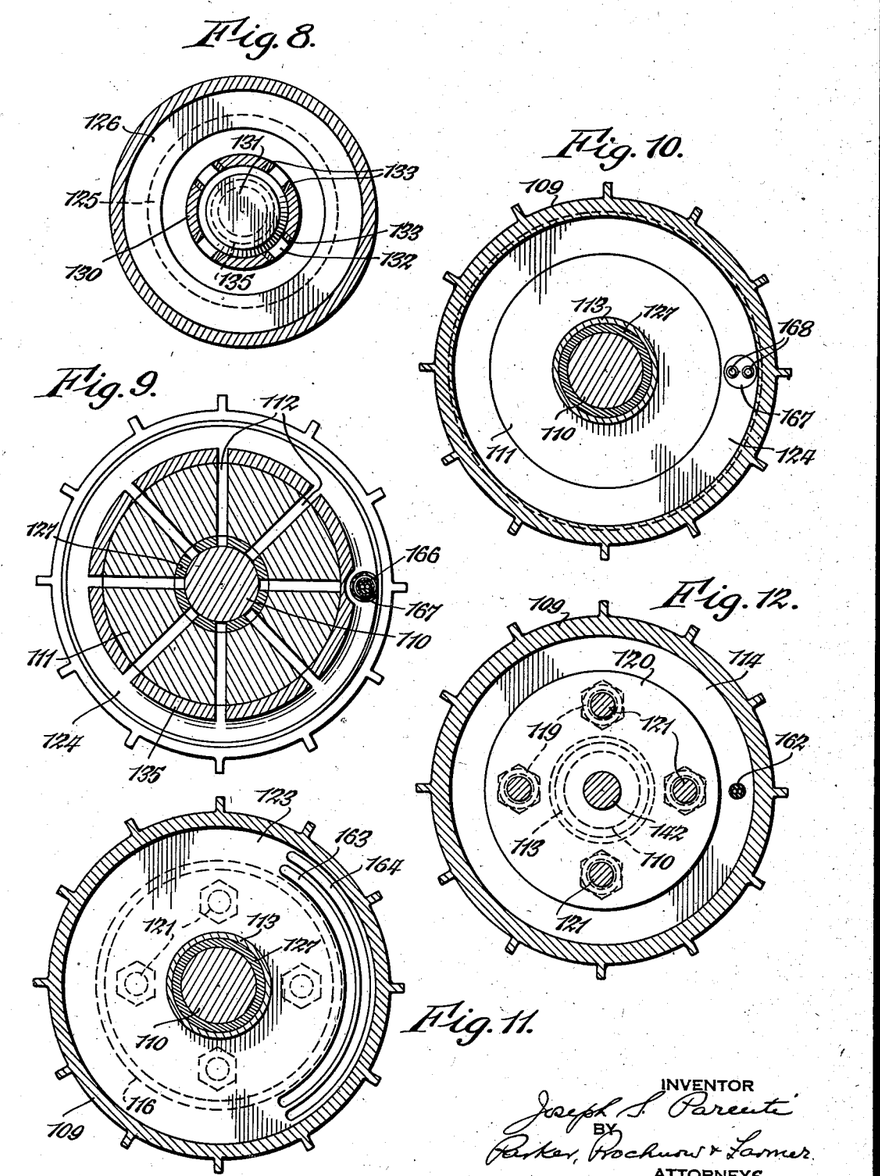
Figs. 8 to 12 inclusive are transverse sectional views on lines 8—8, 9—9, 10—10, 11—11 and 12—12 respectively of Fig. 6.

The solenoid may be of any suitable construction, that shown being substantially similar in construction to the one described in connection with Figs. 1 to 5, and includes a coil 140 into which the upper end of the stop 122 extends. 141 represents the plunger of the solenoid which is connected by means of a rod 142 to the piston 110, the rod extending through a central hole in the stop 122 and loosely engaging the lower end of the piston 110, although this rod may be secured to the piston, if desired. The stop 122 has at its upper end a radially extending portion contacting with the housing 109 to form a portion of the magnetic circuit of the solenoid, and at the lower end of the coil, a sleeve 143 of magnetic material is provided. The lower end of the housing member 109 is closed by means of a shell 145, the upper end of which, in the particular construction shown, has an inwardly extending shouldered portion 146 which has a threaded engagement with the lower end of the housing 109 and which holds the sleeve 143 in place, the shell 145 being preferably made of non-magnetic material. The outer periphery of the coil is spaced from the housing 109 to form a space 147 for cooling liquid, and a combined cushion for the plug and circulating pump for the cooling liquid is formed in the shell 145. In this construction, the lower end of the plunger 141 is provided with a cylindrical recess 149 into which the upper end of a pump cylinder 150 extends, this cylinder containing a piston 151 arranged between upper and lower springs 152 and 153 respectively. The upper spring 152 extends above the upper end of the cylinder 150 and is engaged by the plunger 141 as the same approaches its lower position, so that the momentum of the plunger is absorbed by means of the two springs 152 and 153 and by the work done by the pump piston 151. The cylinder 150 may be suitably secured at its lower end to the bottom of the shell 145, for example, by means of a flange 155 formed integrally with the lower end of the piston and bolted or otherwise secured to the bottom of the shell 145. The cylinder is also provided with an inlet valve 156 adapted to receive cooling liquid from the reservoir formed in the lower portion of the shell 145, and a discharge valve 157 past which liquid is discharged to a pipe 158 terminating in a hold or passage 159 formed in the magnetic sleeve 143 and connecting with the lower portion of the space 147. The cooling liquid is drained from the upper portion of the space 147 by means of an overflow pipe 160 from which liquid is discharged into the storage space formed in the shell 145.

Electric current may be supplied to the coil 140 in any suitable or desired manner, and in the construction illustrated the conductors carrying the current to the coil are embedded in insulating material in a twin cable 162 which extends through suitable apertures formed in the stop 122 and the annular part 114. The two conductors in this cable are connected with a pair of conducting segments 163 and 164 arranged in the bottoms of segmental recesses formed in the upper surface of the insulating member 123, see Figs. 6 and 11. 166 represents a cable carrying a pair of conductors which extend from a suitable make and break switch for supplying intermittent current to the solenoid coil, and which, when the apparatus is used in connection with the pumping of wells, may extend from the apparatus to above the surface of the ground where the make and break switch may be conveniently located. The lower end of the cable 166 extends into a suitable insulating bushing 167 located in a hole in the flange 124 of the discharge pipe or duct 125. This bushing also carries a pair of spring pressed contact brushes 168, Fig. 6, spaced apart and arranged so that one brush contacts with the segment 163 and the other with the segment 164. One of the conductors of the cable 166 is electrically in contact with one of the brushes and the other conductor with the other brush so that current will readily be carried from the conductors of the cable 166 to the conductors of the cable 162. Any other means for conducting electric current to the solenoid coil may, of course, be provided, if desired.

The operation of this pumping mechanism is similar to that described in connection with Figs. 1 to 5 and will be apparent from the foregoing description.

In Figs. 13 to 16, I have shown another form of pumping apparatus somewhat similar in construction to that already described except that in Figs. 13 to 16, the plunger of the solenoid coil moves the pump piston through its suction or intake stroke and the pumping stroke is effected by means of energy stored by the solenoid in a spring or springs. In this construction, 175 represents the piston and 176 the cylinder block in which the piston reciprocates, and which is provided with intake ports 177 which are uncovered when the piston reaches the lower portion of its stroke. The cylinder block shown has an integral upwardly extending valve guide cylinder 178 provided at the lower portion thereof with discharge ports 180, which may be lined with bushings or sleeves 181 of a special alloy or other hard material, as described in connection with Figs. 6 and 8, and 182 represents the reciprocatory valve arranged in the valve guide cylinder 178. In this construction, the valve is of the same diameter as the piston and enters into the upper end of the piston cylinder, closing or cutting off the discharge ports 180. The valve reciprocates in a cylinder lining member 184 secured to the valve cylinder 178 which may also be made of a harder material than the cylinder block and the upper end of the valve is provided with an outwardly extending annular flange 185 which engages a shoulder formed by the upper end of the lining member 184 to stop movement of the valve when the same has closed the discharge ports 180. The outer periphery of the flange 185 is preferably slightly tapered, the portion nearest to the lining member 184 being of greater diameter and fitting closely within the valve guide cylinder. This enables some of the lubricant contained in the valve guide cylinder 178 to pass readily below the flange 185 when the valve moves into opening position, and consequently, upon moving into closing position, this entrapped lubricant forms a cushion which prevents the flange of the valve from pounding on the upper end of the lining member 184. The valve is urged into closing position by any suitable means, such as a spring 186 arranged within the guide cylinder 178 and the pressure exerted by this spring may be varied by means of an adjustable screw-threaded bushing 187 in the upper end of the valve cylinder, the bushing being locked in its adjusted position by means of an externally threaded lock or jamb nut or plug 188.

Figures 13, 14, 15, 16, 17:
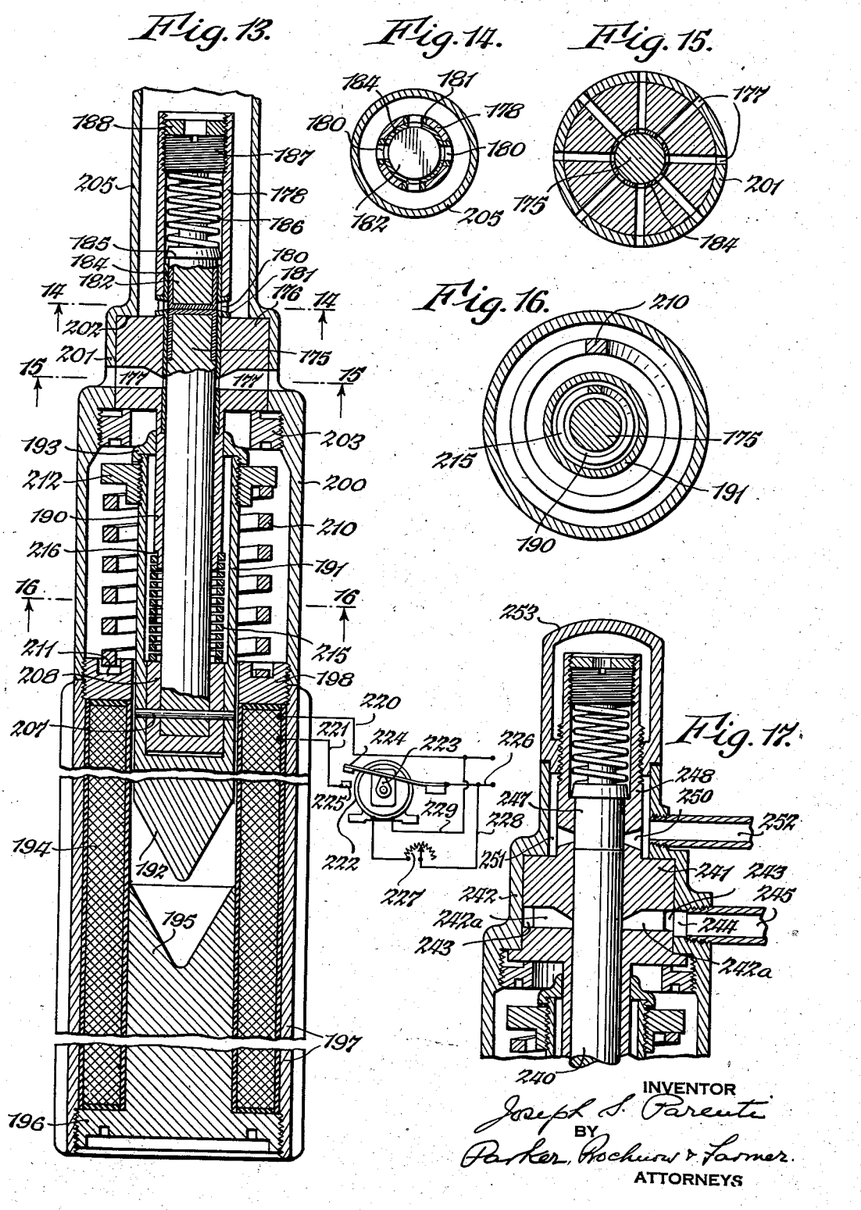
Fig. 13 is a fragmentary central sectional view of a pumping apparatus of still another modified construction and showing diagrammatically an electric circuit opening and closing device such as might be used for actuating any of the various forms of pumping apparatus embodying this invention.
Figs. 14, 15 and 16 are transverse sections on lines 14—14, 15—15, and 16—16 respectively of Fig. 13.
Fig. 17 is a fragmentary central sectional view of a pumping apparatus of still another modified construction.

The cylinder block 176 also may have an integrally downwardly extending cylindrical portion 190 within which the lower portion of the piston 175 is guided in its reciprocatory movement, and which, in the construction shown, also serves to guide the upper part of the solenoid plunger in its movement. In the particular construction shown for this purpose, the cylindrical portion 190 is telescopically arranged in a hollow cylindrical part 191, which may be an integral part of or secured to the plunger 192 of the solenoid. A suitable guide cap 193 may be secured to the upper end of the hollow cylindrical part of the solenoid and the cap has a bore into which the extension 190 of the cylinder block fits. Any other means for guiding the movement of the solenoid plunger may, of course, be used, if desired.

The solenoid includes a coil 194 and a plunger stop 195 extending into the coil from the lower end thereof. The plunger stop is provided at its lower end with an outwardly extending flange or enlargement 196 having a threaded engagement with the solenoid housing 197 which is made of magnetic material, and at the upper end of the solenoid coil, a sleeve 198 of magnetic material is provided which is externally threaded and has a threaded engagement with the upper end of the solenoid housing 197. This sleeve 198 is also employed in the particular construction shown to form a connection between the solenoid housing 197 and the pump housing 200 which is preferably made of non-magnetic material. The lower portion of the pump housing has an internally threaded portion engaging the threaded exterior of the sleeve 198. The pump housing has a portion 201 of reduced diameter terminating at its upper end in an annular shoulder 202. The cylinder block 176 is arranged within the portion 201 of reduced diameter and is held in place by means of an externally threaded clamping ring 203 engaging an internally threaded portion of the pump housing 200 and pressing upwardly against the cylinder block 176 to rigidly hold the same against the internal shoulder 202 of the pump housing. The pump housing also has a portion 205 of still smaller diameter in which the valve guide cylinder 178 is arranged and into which the pumped fluid is discharged. When this pumping apparatus is used in connection with well pumping, the upper end of the part 205 of the pump housing may be suitably connected with a discharge pipe (not shown) leading to the surface of the ground.

The piston 175 may be connected with the solenoid plunger 192 in any suitable or desired manner, and in the construction shown, a pin 207 extends through the lower end of the piston 175 and the hollow cylindrical portion or extension of the plunger 192. Since it may be desirable to make the piston of iron or steel, a shell or thimble 208 of non-magnetic material may be interposed between the lower end of the piston 175 and the plunger 192.

From the foregoing description, it will be obvious that when the coil 194 of the solenoid is energized, the plunger 192 will be drawn into the coil toward the stop 195, thus drawing the piston 175 from its upper position slightly above that shown in Fig. 13 to its lower position below the intake ports 177. Any suitable or desired means may be provided for moving the piston through the pumping stroke, and in the particular construction shown for this purpose, a coil spring 210 is provided which is compressed during the movement of the solenoid plunger into the solenoid coil. This spring may, for example, be conveniently located within the lower portion of the pump housing 200. The lower end of the spring may seat in a suitable recess 211 formed in the sleeve 198 and the upper end of the spring may bear against an internally threaded flange 212, which in the construction shown is secured to the upper threaded portion of the hollow cylindrical part 191 of the solenoid plunger, on which the guide cap 193 is also secured.

Preferably the spring 210 is so proportioned that when the plunger 192 reaches its lowest position, the adjacent coils thereof contact to form a solid stop. Other means for providing a stop may, of course, be employed.

If desired, an additional spring may be provided to supplement the action of the plunger 192 during the initial portion of its movement toward the stop, during which portion of its movement, it receives less power than when it approaches closer to the stop. For this purpose, a spring 215 is arranged within the hollow cylindrical portion 191 of the plunger. The lower end of this spring, in the particular construction shown, bears against the shell or thimble 208 and the upper end of the spring bears against a fixed part of the pumping mechanism, for example, a shouldered portion 216 of the extension 190 of the cylinder block so that this spring is compressed during the upward movement of the piston by the spring 210. This spring may also be formed so that its coils contact to form a solid stop to limit the upper position of the piston.

In its operation, this construction has the very desirable feature of utilizing very efficiently the power of the solenoid. Since the pull of the plunger increases as the same approaches the stop 195, and since the force exerted by the spring 210 against this movement of the plunger also increases according to the extent to which it is compressed, it will be noted that during initial movement of the solenoid plunger when the same exerts the least pull, the spring 210 also offers the least resistance, and furthermore, the movement of the plunger is started by the smaller spring 215 and by the valve spring 186. When the plunger exerts the maximum pull, the spring 210 is compressed to its maximum extent and offers the maximum resistance to the movement of the plunger. Consequently, upon the interruption of the supply of current to the solenoid, the piston will begin its pumping stroke with the maximum power of the spring 210, resulting in an impact against the liquid in the cylinder as soon as the piston has passed the intake ports. This results in lifting the valve 182 well above the discharge ports 180 so that the fluid which is being pumped will be quickly discharged from the cylinder, and, in the case of mixtures of oil and water, the forming of emulsions because of wire drawing will be avoided.

In connection with Fig. 13, I have also shown diagrammatically by way of example, an electric circuit such as might be employed for the purpose of supplying intermittent electric current to any of the various forms of pumping apparatus herein shown. In this diagram, 220 and 221 represent conductors leading to the solenoid coil. In the particular construction shown, the conductor 221 leads to a make and break device which may, for example, include a variable speed motor 222 having a cam 223 secured on its shaft. The cam engages a contact spring 224, one end of which is movable into and out of contact with a terminal 225 to which the conductor 221 is connected, the contact spring 224 being connected to a conductor 226. The conductors 220 and 226 may receive power from any suitable source, not shown.

In order to vary the speed of operation of the pumping apparatus, the speed of the motor 222 may be controlled in any suitable manner, for example, by means of a rheostat 227 arranged in a conductor 228 leading to the motor and receiving power from the conductor 226. The other conductor 229 leading to the motor may be connected to the conductor 220. It will, of course, be understood that these electrical connections are merely illustrative, and any other suitable means for supplying current intermittently to the solenoid coil may be employed. It is, however, generally desirable to provide for wide variations in the time intervals between the electric impulses supplied to the solenoid coil. Since in this manner, the volume delivered by the pump may be varied to suit the particular use to which the pump is applied. For example, in connection with the pumping of oil wells, it is very desirable that the pump operate in such a manner as to pump oil from a well in proportion to the production of the well and to control the operation of the pump in such a manner that the same may operate more or less continuously throughout the twenty-four hours of each day. It is known that if a pump operates continuously in this manner, an oil well will produce a greater quantity of oil per day than if the well is pumped but once a day, as is now commonly done. Consequently, my improved pumping apparatus may be adjusted on the surface of the ground in such a manner that the frequency of the stroke of the piston is varied in proportion to the producing capacity of the well. In cases where the pump is used for other purposes than for pumping oil wells, the variable make and break device may be replaced by one of simpler construction in which the rheostat or speed varying means may be dispensed with.

In Fig. 17 is shown a pumping apparatus similar to that illustrated in Figs. 13 to 16, but constructed so as to provide for pumping fluid through an entirely closed circuit. In this construction, a piston 240 operates in a cylinder block 241 arranged within a pump housing 242. This cylinder block is provided with a plurality of intake ports 242a terminating at their outer ends in an annular manifold or passage 243 connecting with an intake opening 244 in the pump housing, which opening may be connected by means of the tube or passage 245 leading to the supply of fluid to be pumped.

247 represents the discharge valve which is arranged in a valve guide cylinder 248, which is very similar in construction to that shown in Fig. 13, except that the cylinder and piston linings of hardened material are omitted. In this construction also the discharge ports 250 terminate in an annular space or manifold 251 arranged between the valve guide cylinder 248 and the pump housing 242. A discharge pipe 252 connects with the manifold space 251. In this construction, the upper end of the valve guide cylinder 248 is closed by means of a cap or dome member 253 which has a threaded engagement with the valve guide cylinder 248 and forms a fluid tight joint or seal with the upper end of the pump housing 242. The operation of this structure will be readily understood and differs from that described in Figs. 13 to 16 mainly in that the fluid to be pumped is received from the pipe 245 and the pumped fluid is discharged through the pipe 252. It will be seen that this device may be employed for pumping liquids or gases or as a compressor for fluids.

One of the advantages of the various pumps described is that the displacement of the piston is very small, so that the amount of power required for a single stroke is correspondingly small, which, however, makes it possible to use the pump constructions herein described in connection with extremely deep wells, so that these pumps may operate successfully against very high heads. The pumping mechanisms may, however, be operated at high speeds so that the pumps provide for very adequate capacity, in spite of the fact that the piston displacement is small. Another advantage resulting from the small size of the piston is that the linings of the piston and cylinder may be economically made of extremely hard and expensive alloys, such for example as tungsten carbide, "Stellite," or the like, or tool steel, without prohibitive expense in the cost of building the pumping apparatus, since the total quantity of alloys in such linings is small in comparison with the capacity of the pump. This enables the pump to operate for long periods of time in oil wells, even if the oil contains a large amount of grit and solid material.

Another advantage of the making of the pump cylinder and piston of small diameter is that these parts can consequently be made very close fitting and can be machined with great accuracy without having the parts bind due to differences in temperature between the piston and the cylinder. By making the lining of the same material as the cap or surface at the outer end of the piston, differences in coefficients of expansion are avoided. By machining the relatively movable parts with a high degree of accuracy, the liquid which is being pumped can be kept from gaining access into the lubricant chambers, which in turn assures the proper lubrication of the valve and piston.

In connection with very deep oil wells, the raising of the pumping apparatus to the surface and the subsequent lowering of the same into the well involves very considerable expense as well as time. Consequently, this invention has been directed to the idea of providing a pumping apparatus capable of operating for long periods of time without requiring repairs or adjustments of such a nature as would necessitate the removal of the pumping apparatus from the well. For this purpose, the make and break switch is arranged above the ground where it is readily accessible so that repairs or adjustments on the make and break device may be made without removing the pump from the well. The use of expensive alloys on parts exposed to wear also insures the operation of the pump for long periods of time, even in wells where much grit must be pumped. The most frequent sources of trouble in oil well pumps used on deep wells has heretofore been the damage to the valves because the high pressures acting on them cause tremendous pounding upon their seats when closing. In pumps embodying this invention, the valves, as has already been pointed out, are so formed that pounding against their seats is entirely eliminated, this being accomplished partly by closing the valves by means of springs against the pressure head of the fluid being pumped, by gradual movement of the valves toward their seats with the movement of the piston, and providing cushions between the valves and the seats, the cushions being formed by small portions of the fluid which is being pumped in Figs. 1 to 12 and by the lubricant in Figs. 13 to 17. In Figs. 13 to 17, the seats are formed between the flanges of the valves and the shoulders on the valve guide cylinders and are out of contact with the fluid which is being pumped and thus not subject to damage by grit or solid matter in the pumped fluid. Because of these various features, the pumping apparatus herein described may operate successfully for long periods of time under conditions which were practically ruinous to pumping apparatus heretofore provided.

Another advantage of my improved pumping apparatus is that the same can be readily tested above ground without operating the pump against pressure heads such as would be encountered in extremely deep wells. This is due to the fact that the pumping apparatus operates at all times against the pressure of the spring tending to seat the discharge valve and not against the pressure head. Consequently, it is only necessary to adjust the spring which seats the discharge valve for the pressure head against which the pump is to operate, and if the pumping apparatus then operates successfully, it will operate equally successfully when positioned in a well.

Referring again to Figs. 1 to 12, in which the discharge valve is of greater cross sectional area than the piston, it will be noted that when the valve is seated, the area of the valve which is exposed to the pressure of the fluid in the cylinder is approximately equal to the area of the piston. Consequently, the piston is required to exert greater force to initially open the valve than is required to maintain the valve in open position, since immediately after the valve moves from its seat, a larger area of the valve is exposed to the pressure within the cylinder. In these constructions, consequently, the blow or impact of the piston against the fluid in the cylinder is of material assistance in the opening of the valve, since a high pressure is momentarily built up in the fluid in the cylinder because of the blow or impact delivered to this fluid by the piston. This use of the momentum of the movable parts of the pump is particularly helpful, since during the initial pumping stroke of the piston, the solenoid plunger does not exert its maximum power.

As the plunger enters the solenoid and the air gap between the plunger and the stop decreases so that more pressure is exerted by the solenoid plunger, it will be noted that some of this increased pressure is absorbed by the springs 54 and 119, by means of which the piston is moved to its return stroke. In this manner, the increased power of the plunger as it approaches its stop is economically utilized.

I claim as my invention:

1. A pump having a cylinder, a piston arranged to reciprocate in said cylinder, a valve guide cylinder arranged beyond one end of said first mentioned cylinder, and of larger diameter than said piston cylinder, a discharge port in said valve guide cylinder, a seat formed at the end of said piston cylinder adjacent to said valve guide cylinder, a valve arranged to reciprocate in said valve guide cylinder into and out of engagement with said seat, said valve being of larger diameter than said piston and said piston being movable past said seat, means for yieldingly urging said valve toward its seat and into engagement with said piston, when said piston moves past said seat, whereby said yielding means and said valve exert pressure on said piston in the direction of its return stroke.

2. A pump having a cylinder, a piston arranged to reciprocate in said cylinder, a valve guide cylinder arranged beyond one end of said first mentioned cylinder and forming a continuation of said piston cylinder, a discharge port in said valve guide cylinder, a valve in said guide cylinder adapted to move past said port to open and close the same, the movement of said valve and the stroke of said piston being such that said valve engages said piston at the end of its pumping stroke, and means for yieldingly urging said valve into position to close said port and to exert pressure against said piston in the direction of its return stroke.

3. A pump having a cylinder, a piston arranged to reciprocate in said cylinder, a valve guide cylinder arranged beyond one end of said first mentioned cylinder and of larger diameter than said piston cylinder, a discharge port in said valve guide cylinder, a seat formed at the end of said piston cylinder adjacent to said valve guide cylinder, a valve arranged to reciprocate in said valve guide cylinder into and out of engagement with said seat, said valve being of larger diameter than said piston and said piston being movable beyond said seat to engage said valve, whereby force exerted by the piston to hold said valve open is less than the force acting to seat said valve.

4. A pump including a housing having a cylinder formed therein, said housing having a passage formed therein for the pumped fluid and arranged at one end of said cylinder, a piston arranged to reciprocate in said cylinder, a cylindrical discharge valve cooperating with said end of said cylinder for opening and closing the same, a guide cylinder for said valve arranged in said discharge passage in said pump housing, and a substantially horizontally extending web arranged between said valve guide cylinder and the outer wall of said pump housing, and a tubular duct forming a passage through said wall and terminating at its lower end at a distance below said wall to form a pneumatic chamber against which fluctuating pressures in said discharge passage act.

5. A pump having a cylinder, a piston arranged to reciprocate in said cylinder, a lining of hard material on the inner surface of said cylinder, a covering of hard material on the head end of said piston, a discharge valve for opening and closing an end of said cylinder and having a seat engaging portion of hard material secured thereto, said lining for said cylinder having a seat formed thereon for said valve.

6. A pump having a cylinder, a piston arranged to reciprocate in said cylinder, a lining for said cylinder formed of a plurality of tubular elements arranged endwise in said cylinder and formed of a harder material than that of the cylinder, a valve guide cylinder arranged beyond the discharge end of said first mentioned cylinder, a valve arranged in said valve guide cylinder, a lining of hard material in said valve guide cylinder and formed of a plurality of tubular sections, and means exerting pressure endwise on the lining sections of said piston cylinder and valve guide cylinder for holding said lining sections in correct relation in said cylinders.

7. A pump including a cylinder, a piston arranged to reciprocate in said cylinder, a valve guide cylinder arranged beyond the discharge end of said first mentioned cylinder, a valve arranged in said valve guide cylinder for opening and closing the discharge end of said piston cylinder, linings of hard material in said cylinders, a covering member of hard material enclosing the head and adjacent cylindrical portions of said piston, and a surface of hard material secured on the portion of said valve exposed to the fluid which is being pumped.

8. A solenoid operated pumping apparatus including a cylinder, a piston reciprocable therein, a solenoid coil, a plunger actuated by said solenoid coil and connected with said piston to impart movement thereto, a housing for said solenoid and having a space for the circulation of a cooling liquid in contact with said coil, and means actuated by said solenoid for circulating a cooling liquid in the space between said solenoid coil and said housing.

9. A solenoid operated pumping apparatus including a cylinder, a piston reciprocable therein, a solenoid coil, a plunger actuated by said solenoid coil and connected with said piston to impart movement thereto, a housing for said solenoid and having a space for the circulation of a cooling liquid in contact with said coil, a chamber connected with said housing and containing cooling liquid, and means actuated by the movement of said solenoid to circulate cooling liquid from said chamber to said space in said housing.

10. A solenoid operated pumping apparatus including a cylinder, a piston reciprocable therein, a solenoid coil, a plunger actuated by said solenoid coil and connected with said piston to impart movement thereto, a housing for said solenoid and having a space for the circulation of a cooling liquid in contact with said coil, a chamber connected with said housing and containing cooling liquid, and means in said chamber for yieldingly stopping the movement of said plunger during the stroke of said piston and for circulating cooling liquid from said chamber through the space in said housing.

11. A solenoid operated pumping apparatus including a cylinder, a piston reciprocable therein, a solenoid coil, a plunger actuated by said solenoid coil and connected with said piston to impart movement thereto, a housing for said solenoid and having a space for the circulation of a cooling liquid in contact with said coil, and means for yieldingly stopping movement of said plunger during the suction stroke of said piston, said means also producing circulation of cooling liquid in said space.

12. A solenoid operated pumping apparatus including a cylinder, a piston reciprocable therein, a solenoid coil, a plunger actuated by said solenoid coil and connected with said piston to impart movement thereto, a housing for said solenoid and having a space for the circulation of a cooling liquid in contact with said coil, a chamber for cooling liquid, and means for yieldingly stopping the movement of said plunger at the end of the suction stroke of said piston, said means including a pump for circulating liquid from said chamber through said space in said housing.

13. A solenoid operated pumping apparatus including a cylinder, a piston reciprocable therein, a solenoid coil, a plunger actuated by said solenoid coil and connected with said piston to impart movement thereto, a housing for said solenoid and having a space for the circulation of a cooling liquid in contact with said coil, a chamber for cooling liquid, a second cylinder containing a reciprocable piston, springs in said cylinder at opposite ends of said piston, one of said springs being engaged by said plunger during the last portion of the suction stroke of said first mentioned piston for stopping the movement of said plunger by compressing said springs and moving said second piston, and connections between said second cylinder, said chamber and said space in and housing for circulating cooling liquid when said second piston is moved.

14. A solenoid actuated pumping apparatus including a tubular housing containing a solenoid in an intermediate portion thereof, a cylinder arranged at one end of said solenoid and containing a reciprocable piston, said solenoid including a plunger connected with said piston, a pumping device arranged at the other end of said solenoid and including a cylinder and a piston, a spring at each end of said last mentioned piston, one of said springs being engaged by said plunger for yieldingly stopping movement of said plunger and for supplying power to said last mentioned piston, and means connected with said last mentioned cylinder for conducting cooling liquid into contact with said solenoid.

15. A pumping apparatus including a pump cylinder, a piston arranged to reciprocate in said cylinder, a discharge valve at one end of said cylinder, said cylinder having an inlet port arranged at a distance from the discharge end thereof and which is uncovered by said piston for admitting fluid to be pumped to said cylinder, said piston being movable during its suction stroke beyond said inlet port, a solenoid including a plunger bearing against said piston during the pumping stroke thereof and having a longer path of movement than said piston and movable out of contact with said piston when the piston reaches the end of its suction stroke, said plunger when said solenoid is energized, acquiring momentum before contacting with said piston for imparting rapid motion to said piston during the initial movement of the same past said intake port, whereby high pressure of the liquid in the cylinder is produced by the momentum of said plunger and said piston, after the piston closes said intake port.

16. A pumping apparatus including a pump cylinder, a piston arranged to reciprocate in said cylinder, a solenoid including a plunger connected with said piston to impart movement thereto during the suction stroke of said piston when said solenoid is energized, a spring which is compressed by movement of said plunger during the suction stroke of said piston and which when said solenoid is de-energized, moves said piston during its pumping stroke, and a smaller spring which is compressed during the final movement of said first mentioned spring, and which starts the return movement of said piston and plunger after completion of the pumping stroke thereof.

17. A pumping apparatus including a pump cylinder, a piston arranged to reciprocate in said cylinder, a solenoid including a plunger connected with said piston to impart movement thereto during the suction stroke of said piston when said solenoid is energized, a spring which is compressed by movement of said plunger during the suction stroke of said piston and which when said solenoid is de-energized, moves said piston during its pumping stroke, and a smaller spring which is compressed during the final movement of said first mentioned spring, and which starts the return movement of said piston and plunger after completion of the pumping stroke thereof, said springs having the adjacent coils thereof formed to contact with each other to act as stops for limiting the movement of said piston in both directions.

18. A pump having a cylinder, a piston arranged to reciprocate in said cylinder, a valve guide cylinder arranged at the end of said first mentioned cylinder, a valve in said valve guide cylinder, and having an outwardly extending flange, means for urging said valve into closing position, and a shoulder in said valve guide cylinder on which said flange seats to stop the movement of said valve into closing position, said valve guide cylinder containing lubricant for said valve, said flange, when the valve is moving into closing position, entrapping lubricant between said flange and said shoulder to momentarily form a cushion between said flange and shoulder to cause said shoulder to move slowly into engagement with said seat.

JOSEPH S. PARENTI.